United States Patent
Krishnamurthy et al.

(10) Patent No.: US 7,136,872 B2
(45) Date of Patent: Nov. 14, 2006

(54) METHOD, SYSTEM, AND ARTICLE OF MANUFACTURE FOR TRANSFERRING STRUCTURED DATA BETWEEN DIFFERENT DATA STORES

(75) Inventors: Saileshwar Krishnamurthy, Berkeley, CA (US); Leo Lau, Richmondhill (CA)

(73) Assignee: International Business Machines Corporation, Armonk, NY (US)

( * ) Notice: Subject to any disclaimer, the term of this patent is extended or adjusted under 35 U.S.C. 154(b) by 699 days.

(21) Appl. No.: 10/123,478

(22) Filed: Apr. 16, 2002

(65) Prior Publication Data

US 2003/0195987 A1    Oct. 16, 2003

(51) Int. Cl.
G06F 7/00 (2006.01)
G06F 17/00 (2006.01)

(52) U.S. Cl. ............... 707/104.1; 707/101; 707/103 R; 707/103 Z

(58) Field of Classification Search ................ 707/104, 707/100, 104.1, 101, 103 R, 103 Z
See application file for complete search history.

(56) References Cited

U.S. PATENT DOCUMENTS

| | | | |
|---|---|---|---|
| 5,339,413 A | 8/1994 | Koval et al. | |
| 5,557,761 A | 9/1996 | Chan et al. | |
| 5,608,874 A | 3/1997 | Ogawa et al. | |
| 5,734,908 A | 3/1998 | Chan et al. | |
| 5,915,252 A | 6/1999 | Misheski et al. | |
| 5,937,409 A * | 8/1999 | Wetherbee | 707/103 R |
| 5,953,716 A | 9/1999 | Madnick et al. | |
| 6,055,525 A | 4/2000 | Nusbickel | |
| 6,105,124 A | 8/2000 | Farber et al. | |
| 6,128,652 A | 10/2000 | Toh et al. | |
| 6,684,222 B1 * | 1/2004 | Cornelius et al. | 707/104.1 |
| 6,795,868 B1 * | 9/2004 | Dingman et al. | 709/246 |
| 6,957,228 B1 * | 10/2005 | Graser | 707/103 R |
| 6,961,730 B1 * | 11/2005 | Kagalwala et al. | 707/102 |
| 6,996,566 B1 * | 2/2006 | George et al. | 707/100 |
| 6,999,956 B1 * | 2/2006 | Mullins | 707/2 |
| 7,031,956 B1 * | 4/2006 | Lee et al. | 707/3 |
| 7,043,481 B1 * | 5/2006 | Mullins et al. | 707/10 |
| 2001/0032207 A1 * | 10/2001 | Hartley et al. | 707/102 |
| 2002/0091702 A1 * | 7/2002 | Mullins | 707/100 |
| 2002/0161757 A1 * | 10/2002 | Mock et al. | 707/5 |
| 2005/0050068 A1 * | 3/2005 | Vaschillo et al. | 707/100 |

OTHER PUBLICATIONS

IBM, "Application Development Guide", IBM DB2 Universal Database, Version 7, IBM Document No. SC09-2949-01, 1993, Chapter 12, pp. 291-348.

* cited by examiner

Primary Examiner—Don Wong
Assistant Examiner—Thanh-Ha Dang
(74) Attorney, Agent, or Firm—Rabindranath Dutta; Konrad Raynes & Victor LLP

(57) ABSTRACT

Provided is a method, system, and an article of manufacture for transferring structured data between different data stores. Data stores include a type identifier with every instance of a structured data type. A typeID-typeName map within each data store includes the mapping between the type identifiers and the type names of the structured data types. The typeID-typeName map is sent as metadata while transferring data from a source database to a target database. An application replaces the type identifiers of the source database with the corresponding type identifiers of the target database.

27 Claims, 4 Drawing Sheets

METHOD, SYSTEM, AND ARTICLE OF MANUFACTURE FOR TRANSFERRING STRUCTURED DATA BETWEEN DIFFERENT DATA STORES

BACKGROUND OF THE INVENTION

1. Field of the Invention

The present invention relates to a method, system, and an article of manufacture for transferring structured data between different data stores.

2. Description of the Related Art

A database management system, such as a relational database management system, may store data in tables comprised of rows and columns. The types of data in the columns of a table are defined when the table is created. In some database management systems the types of data may be limited to instances of a base data type, such as instances of an integer data type, a real data type, a string data type, a character data type etc.

In other database management systems, values within the columns of a table are not limited to instances of a base data type but can be instances of user-defined structured data types. A structured data type is a data type made up of a collection of one or more attributes, where each attribute may be of a base data type or a structured data type. A type name identifies a structured data type. Subtypes may extend an existing structured data type reusing all of the attributes of the structured data type and contain additional attributes specific to the subtype. For example, a structured data type with the type name Person might contain attributes for Name, Age, and Address. A subtype of Person might be named Employee, where the subtype Employee contains the attributes Name, Age, and Address and in addition contains attributes for SerialNumber, Salary, and BusinessUnit. An instance of a structured data type includes an identifier, where the identifier identifies the structured data type in the database management system where the structured data type was created.

If a column is of a particular structured data type, the values within the column can be instances of either the structured data type or of any subtype of the structured data type. Further details of structured data types in database management systems are described in the publication entitled "IBM DB2 Universal Database: Application Development Guide, Version 7" (copyright, IBM 2001), which publication is incorporated herein by reference in its entirety.

Database management systems may transfer data from a source database to a target database. In prior art database management systems, when values within a column are instances of a well-known base data type, the target database can interpret the transferred data. However, if the values within a column are instances of user-defined structured data types, in prior art database management systems the target database cannot interpret the transferred data.

Hence, there is a need in the art to provide techniques for transferring structured data between database management systems.

SUMMARY OF THE PREFERRED EMBODIMENTS

Provided are a method, system, and article of manufacture for transforming structured data, wherein each structured data is an instance of one of a plurality of structured data types and wherein each structured data type has a type name. A first mapping of type names to first identifiers is received, wherein the first identifiers uniquely identify the structured data types. Further received is the structured data wherein the structured data has the first identifiers. A second mapping of the type names to second identifiers is received, wherein the second identifiers uniquely identify the structured data types. The structured data is modified by first mapping the first identifiers in the structured data to corresponding type names from the first mapping. Next, the corresponding type names are mapped to the second identifiers from the second mapping. Finally, the first identifiers in the structured data are substituted with the second identifiers.

In further implementations, the first mapping is provided in a source, wherein the first identifiers uniquely identify the structured data types within the source. The second mapping is provided in a target, wherein the second identifiers uniquely identify the structured data types within the target. The modified structured data is sent to the target after replacing the first identifiers. In one implementation, the source and target are databases.

Further implementations provide a method in a database for processing structured data, wherein each structured data is an instance of one of a plurality of structured data types. The method comprises providing a mapping between structured data types and identifiers within the database, wherein the identifiers uniquely identify structured data types within the database and in response to a request to the database for the mapping from an application, sending the mapping to the application. In one implementation, in response to a request to the database for the structured data, the database sends the structured data including identifiers to the application. In another implementation, the database receives the structured data including identifiers from the application, wherein each received identifier is valid within the database.

The implementations enable data stores to exchange structured data and interpret the exchanged structured data without an intermediary inspecting the contents of the data, i.e. a mapping is sufficient to interpret the exchanged structured data. The implementations can be used for data replication or for exporting data from databases.

BRIEF DESCRIPTION OF THE DRAWINGS

Referring now to the drawings in which like reference numbers represent corresponding parts throughout.

DETAILED DESCRIPTION OF THE PREFERRED EMBODIMENTS

In the following description, reference is made to the accompanying drawings which form a part hereof and which illustrate several implementations. It is understood that other implementations may be utilized and structural and operational changes may be made without departing from the scope of the present implementations.

Figure 1:
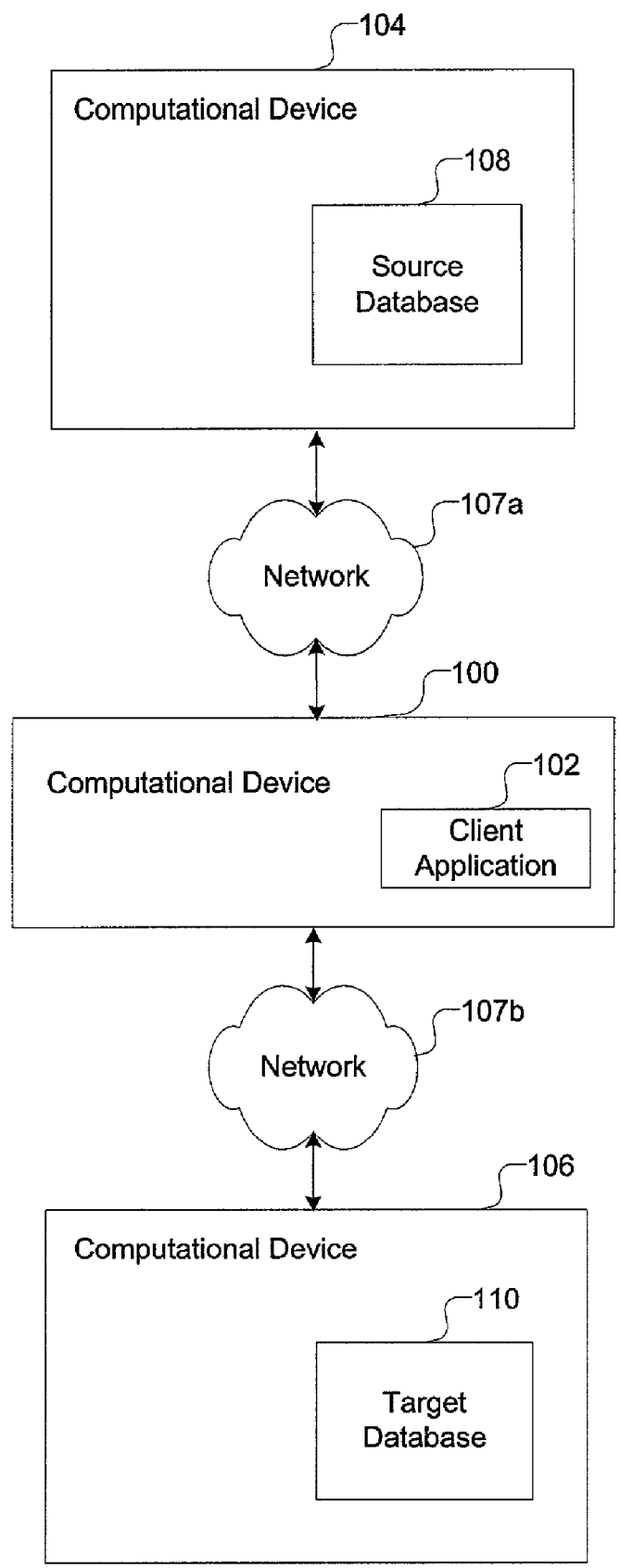
FIG. 1 illustrates a block diagram of a computing environment in which certain described aspects of the invention are implemented.

FIG. 1 illustrates a block diagram of a computing environment in which certain aspects of the invention are implemented. A computational device 100 comprising a client application 102 is connected to a plurality of computational devices 104, 106. The computational devices 100, 104, 106 may comprise any computational device known in the art, including a personal computer, a workstation, a server, a mainframe, a hand held computer, a palm top computer, a telephony device, etc. The computational device 100 may be connected to the computational devices 104, 106 by networks 107a, 107b respectively. The networks may be any network known in the art, such as the Internet, an intranet, a local area network etc. The computational device 100 may alternatively be connected to the computational devices 104, 106 without a network, such as through direct lines, common bus systems etc., in a manner known in the art.

Computational device 104 comprises a source database 108, and computational device 106 comprises a target database 110. The source database 108 and the target database 110, may comprise any database management system known in the art, such as an object-relational database, a hierarchical database, an object-oriented database etc.

Figure 2:
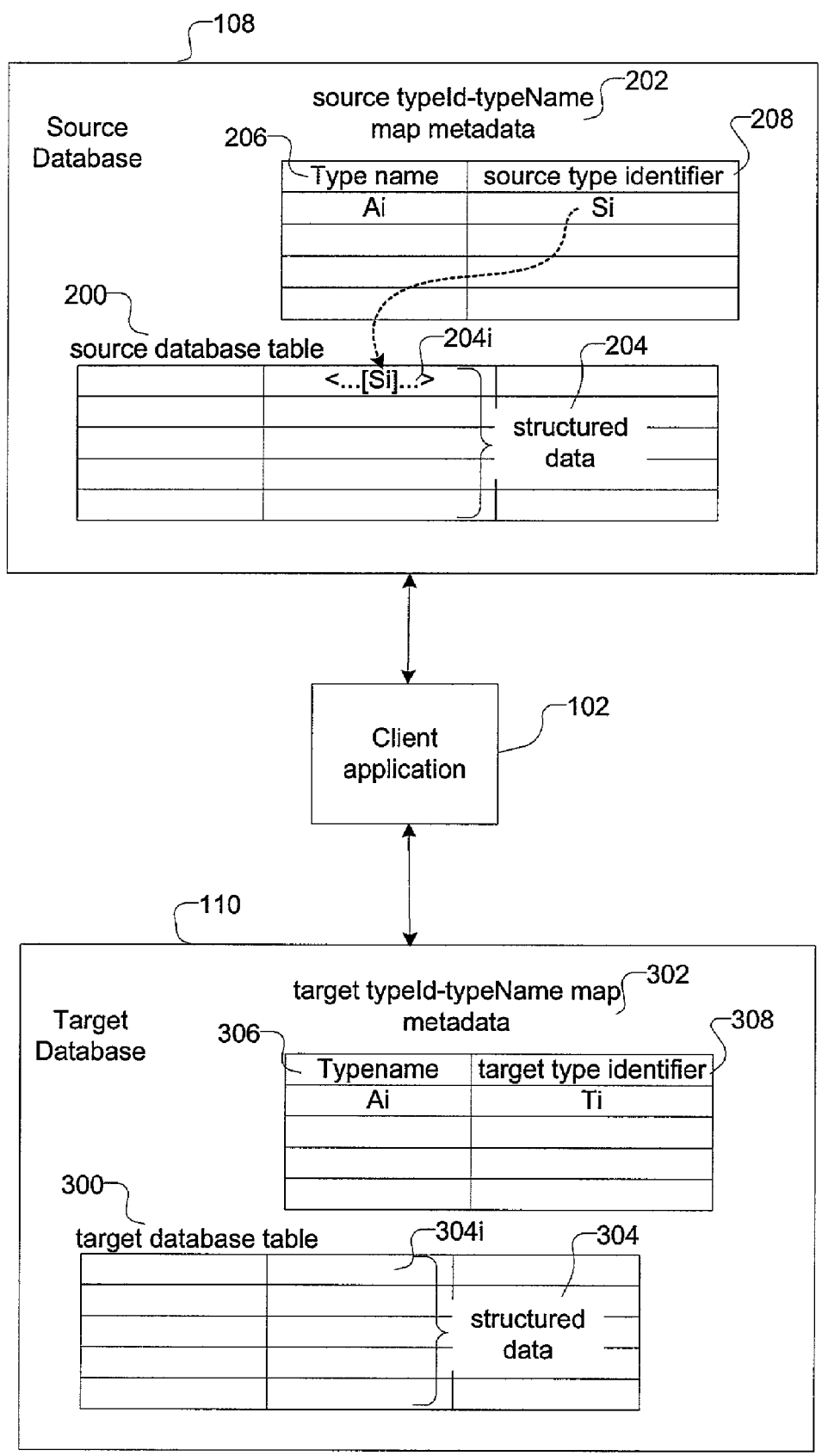
FIG. 2 illustrates a block diagram of software elements and data structures in which certain described aspects of the invention are implemented.

FIG. 2 illustrates a block diagram of software elements and data structures in which certain aspects of the invention are implemented. The source database 108 comprises a source database table 200 and a source typeID-typeName map metadata 202 (a typeID-typename map metadata is hereinafter referred to as a typemap). The source database table 200 comprise table entries, where the table entries contain structured data 204. Each structured data 204i is an instance of one of a plurality of structured data types, where each structured data type has a type name 206. The type name 206 is a character string that describes the structured data type.

Each structured data 204i includes a source type identifier 208, where the source type identifier 208 uniquely identifies the structured data type corresponding to the structured data 204i, within the source database 108. The structured data 204i does not include the type name 206 to conserve space in the source database 108. Otherwise, including a potentially long character string, where the long character string describes the structured data type corresponding to structured data 204i, with each structured data 204i would greatly increase the size of the source database 208. The source type identifier 208 corresponding to a structured data type with type name 206 is specific to the source database 108 and is a unique identifier within the source database 108. In certain situations, another database management system may not be able to interpret the source type identifier 208 used in the source database 108. Furthermore, since structured data can be nested, a nested structured type instance contains identifiers that identify the nested type.

The source type map 202 stores a mapping of the source type identifiers 208 to type names 206 within the source database 108. Although, the source type identifiers 208 and type names 206 have a unique mapping to each other in the source database 108, the unique mapping may be invalid in any other database.

FIG. 2 further illustrates the data structures within the target database 110, where the target database 110 comprises a target database table 300 and a target type map 302. The target database table 300 comprise table entries, where the table entries contain structured data 304. Each structured data 304i includes a target type identifier 308, where the target type identifier 308 uniquely identifies the structured data type corresponding to the structured data 304 within the target database 110. The target type map 302 stores a mapping of the target type identifiers 308 to type names 306 within the target database 110. FIG. 2 further illustrates the client application 102 connected to the source database 108, and the target database 110.

Figure 3:
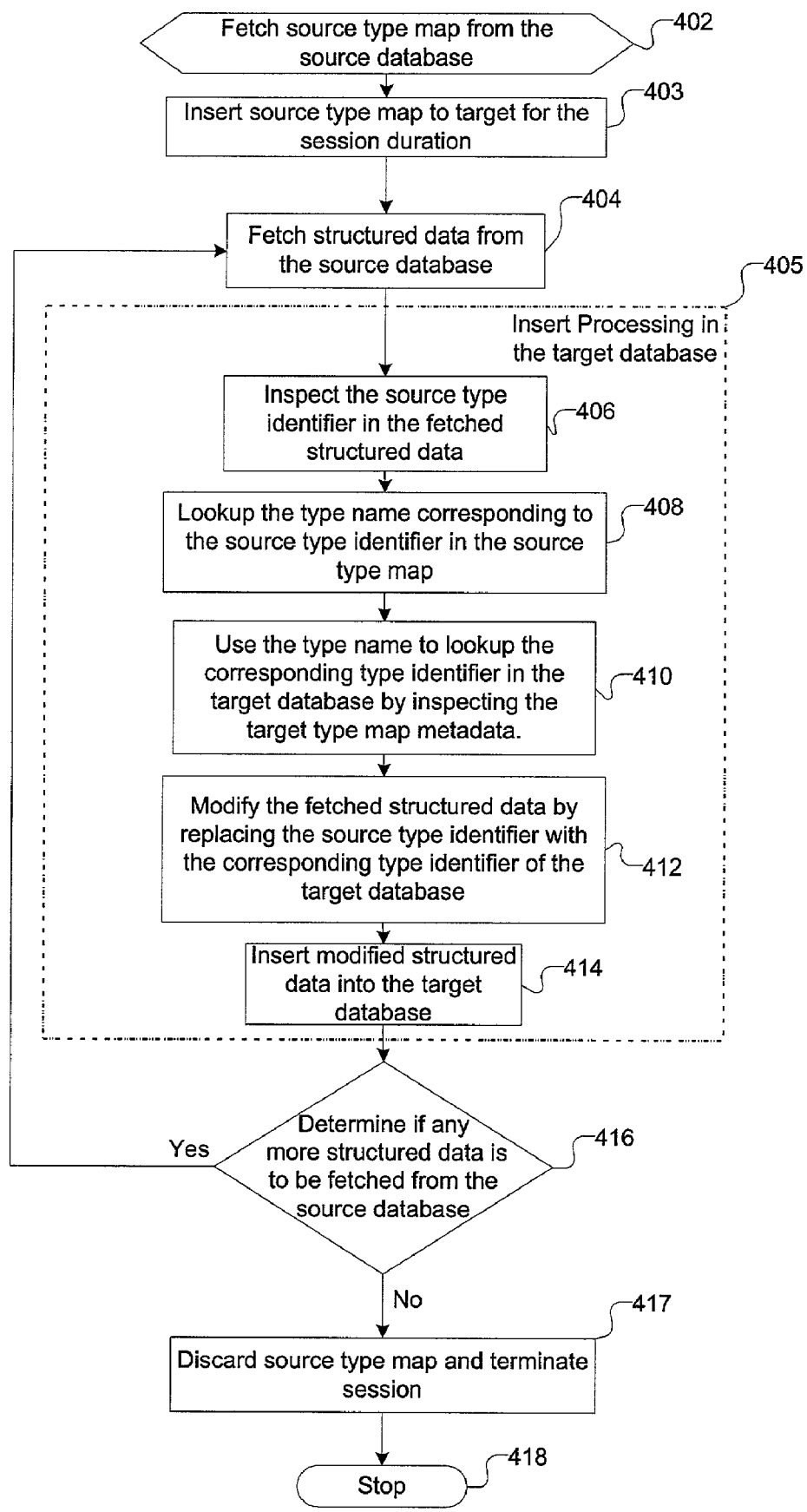
FIG. 3 illustrates logic implemented in an application to transform structured data in accordance with certain described implementations of the invention.

FIG. 3 illustrates logic implemented via the client application 102 to transform structured data in accordance with certain implementations of the invention. The implemented logic is performed within the target database 110, directly or indirectly via the client application 102. In one implementation the client application 102 initiates the process described in FIG. 3 and the logic described in FIG. 3 is performed within the target database 110. In another implementation the client application 102 directly performs the logic described in FIG. 3 on the target database 110. While the implementation describes the logic of FIG. 3 as being performed by the client application 102, being performed by the client application 102 is also intended to encompass being initiated by the client application 102 and performed as a result of the initiation.

The client application 102 fetches (at block 402) the source type map 202 from the source database 108. The client application 102 inserts (at block 403) the source type map 202 to the target database 110 for the duration of a session. Control proceeds to block 404, where the client application 102 fetches a structured data 204i from the source database 108. In alternative implementations, the client application 102 may fetch a stream of data, where the stream of data comprises a plurality of structured data 204. In some implementations, the fetching may be done by a Structured Query Language (SQL) "select" statement.

The next series of blocks 406 to 414 is part of a larger block 405, where the logic of block 405 performs insert processing in the target database 110. Insert processing in the target database 110 inserts the structured data 204i in an appropriate manner within the target database 110. Blocks 406 to 414 perform various steps of the insert processing in the target database 110. The substitution of target type identifiers in the structured type data is an action that is part of insert processing in the target database. Among other reasons, insert processing is performed within the target database because the target database cannot always trust the data received by the target database.

As part of the insert processing, the client application 102 inspects (at block 406) the source type identifier 208 within the fetched structured data 204i. Control proceeds to block 408, where the client application 102 looks up the type name 206 corresponding to the source type identifier 208 in the source type map 202. Control proceeds to block 410, where the client application 102, uses the type name 206 to lookup the corresponding target type identifier 308 in the target database 110 by inspecting the target type map 302. The client application 102 may lookup the corresponding target type identifier 308 by requesting the target database 110 to send the target type map 302. The typename 206 and the typename 306 in the source database 108 and the target database 110 are the same in certain implementations. The client application 102 modifies (at block 412) the fetched structured data 204i by replacing the source type identifier 208 with the corresponding target type identifier 308 of the target database 110, and creates a modified structured data 304i. Control proceeds to block 414, where the client application 102 inserts the modified structured data 304i into the target database table 300 in the target database 110. In one implementation, at block 414, the client application 102 uses an SQL "insert" statement to insert the data to the target database 110. At the conclusion of block 414 insert processing in the target database is completed.

Control proceeds to block 416, where the client application 102 determines if any more structured data 204 is to be fetched from the source database 108. If yes, control proceeds to block 404, and the logic of blocks 404 to 416 are repeated. If not, control proceeds to block 417 where the client application 102 discards the source type map 202 and terminates the session. Subsequently the process stops (at block 418).

FIG. 3 illustrates the logic to transform structured data from the perspective of the client application 102. The source database 108 and the target database 110 execute logic to support the transformation operations performed by the client application 102. In particular, to support the logic executed in blocks 404 and 406, in response to fetch requests to the source database 108 for the structured data 204*i* and the source type map 202, the source database 108 sends the type map 202 and the structured data 204*i* to the application client 102.

Similarly, in support of the logic executed in block 410, the target database 110 may in response to a request for the target type map 302 from the client application 102, send the target type map 302 to the client application 102. In support of the logic executed in block 414, the target application 110 may receive the modified structured data 304*i* from the client application 102.

Figure 4:
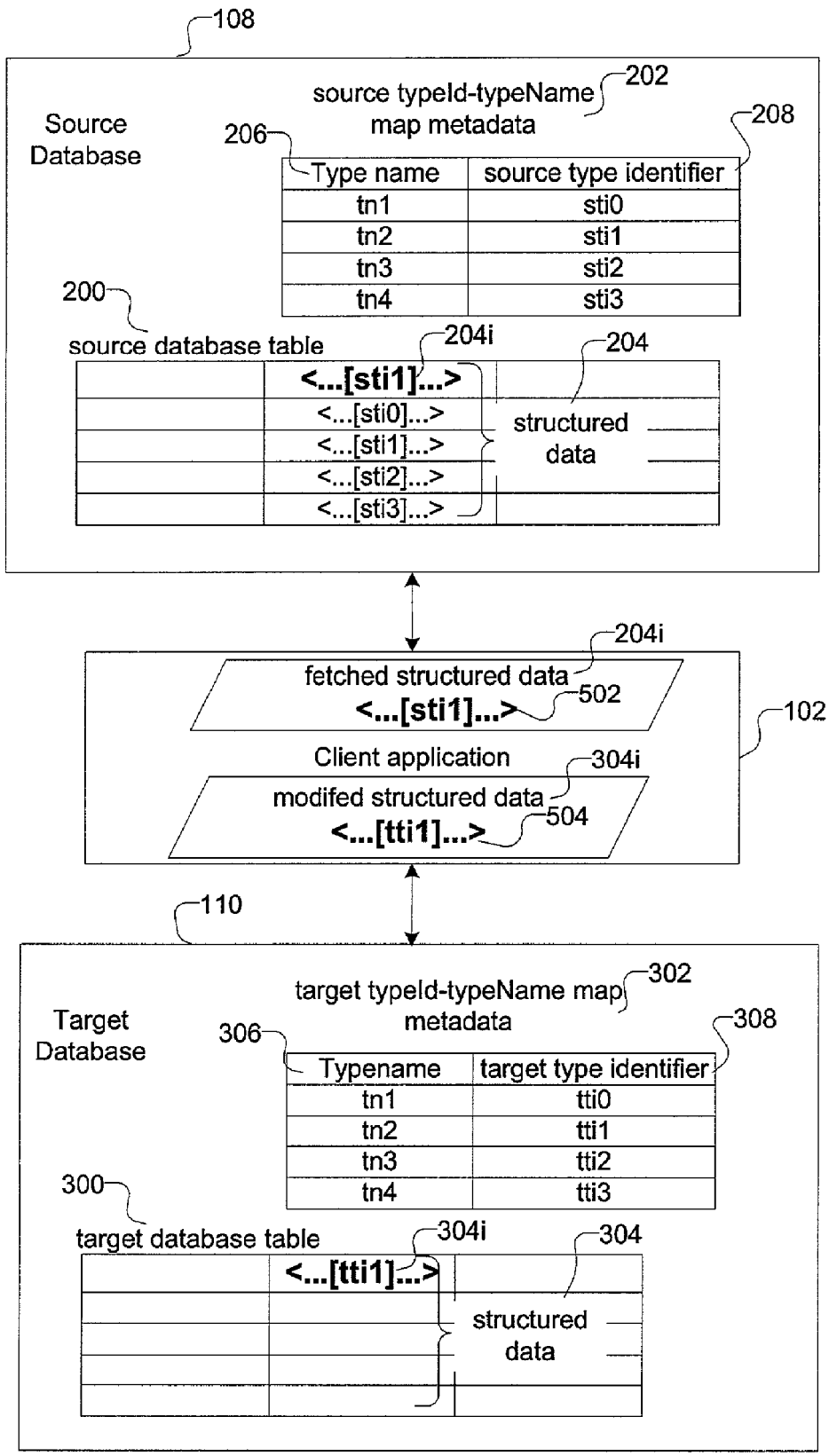
FIG. 4 illustrates data structures populated in accordance with certain described implementations of the invention.

FIG. 4 illustrates the data structures described in FIG. 3 populated in accordance with certain implementations of the invention. The source type map 202 has four type names tn1, tn2, tn3, tn4 with corresponding source type identifiers sti0, sti1, sti2, sti3 respectively. The target type map 302 has for the same four type names tn1, tn2, tn3, tn4 and target type identifiers tti0, tti1, tti2, tti3 respectively. A structured data 204*i* within the source database table 200 has value < . . . [sti1] . . . >, where sti1 is the source type identifier and the ellipsis indicate the data contained within the structured data 204*i*. At block 404 of FIG. 3, the client application 102 fetches the structured data 204*i*. FIG. 4 shows the fetched structured data 204*i* with value < . . . [sti1] . . . > 502 within client application 102. Since source type identifier sti1 maps to type name tn2 and type name tn2 maps to target type identifier tti1, the client application at block 412 of FIG. 3 modifies the fetched structured data 204*i*, and FIG. 4 shows the modified structured data 304*i* with value < . . . [tti1] . . . > 504 within client application 102. The client application 102 inserts the modified structured data 304*i* into target database table 300.

The implementations store type identifiers with structured data and enable data stores to exchange structured data and interpret the exchanged structured data. The length of type identifiers within the data stores are small when compared to the length of the type names of the structured data types. Hence, the size of the data stores do not increase significantly when the structured data includes type identifiers. The implementations may be used for data replication, where a client application gets newly fetched data from a source database, modifies the newly fetched data and saves the data to a target database. The implementations can be also be used for exporting structured data from within a data store to a target database on a data store.

Additional Implementation Details

The described techniques for transferring data between data stores may be implemented as a method, apparatus or article of manufacture using standard programming and/or engineering techniques to produce software, firmware, hardware, or any combination thereof. The term "article of manufacture" as used herein refers to code or logic implemented in hardware logic (e.g., an integrated circuit chip, Programmable Gate Array (PGA), Application Specific Integrated Circuit (ASIC), etc.) or a computer readable medium (e.g., magnetic storage medium, such as hard disk drives, floppy disks, tape), optical storage (e.g., CD-ROMs, optical disks, etc.), volatile and non-volatile memory devices (e.g., EEPROMs, ROMs, PROMs, RAMs, DRAMs, SRAMs, firmware, programmable logic, etc.). Code in the computer readable medium is accessed and executed by a processor. The code in which implementations are made may further be accessible through a transmission media or from a file server over a network. In such cases, the article of manufacture in which the code is implemented may comprise a transmission media, such as a network transmission line, wireless transmission media, signals propagating through space, radio waves, infrared signals, etc. Of course, those skilled in the art will recognize that many modifications may be made to this configuration without departing from the scope of the implementations, and that the article of manufacture may comprise any information bearing medium known in the art.

The described implementations show the client application, the source database, and the target database in three different computational devices. In alternative implementations the client application, the source database and the target database may be in a single computational device or may be distributed in a plurality of computational devices. The client application may also be part of either the target database or the source database. Furthermore, the source and target databases need not be instances of the same database management system. The source database and target database must in such a case expose their respective application programming interfaces and metadata formats to the client application.

The client application connects to a single target database in the described implementations. In alternative implementations, the client application may connect to a plurality of target databases, where the plurality of target databases comprise one or more computational devices. When the client application connects to a plurality of target databases the client application does not have to perform identifier substitution while sending data to each target. The insert process corresponding to a target database performs the identifier substitution. The client behavior does not depend on the target database or the target type map. Also by deferring identifier substitution to the insert processing on the target database, the functions of the client application are simplified.

The implementations of FIG. 3 describe specific operations occurring in a particular order. Further, the steps may be performed in parallel as well as sequentially. In alternative embodiments, certain of the logic operations may be performed in a different order, modified or removed and still implement preferred embodiments of the present invention. Morever, steps may be added to the above described logic and still conform to the preferred embodiments. In further implementations, integrity checks may be performed on structured data before inserting the structured data into the target database in a manner known in the art. Also, the conversion of byte-orders and codepages are not described in the implementations and are performed in a manner known in the art.

Therefore, the foregoing description of the implementations has been presented for the purposes of illustration and description. It is not intended to be exhaustive or to limit the invention to the precise form disclosed. Many modifications and variations are possible in light of the above teaching. It is intended that the scope of the invention be limited not by this detailed description, but rather by the claims appended hereto. The above specification, examples and data provide a complete description of the manufacture and use of the composition of the invention. Since many embodiments of the invention can be made without departing from the spirit and scope of the invention, the invention resides in the claims hereinafter appended.

What is claimed is:

1. A computer implemented method for transforming structured data, wherein each structured data is an instance of one of at least one structured data type, wherein each structured data type has a type name, the method comprising:

receiving a first mapping of at least one type name to at least one first identifier, wherein each first identifier uniquely identifies one structured data type, wherein the at least one first identifier is smaller in length than the at least one type name, wherein the first mapping is provided in a source, and wherein the first identifiers uniquely identify the structured data types within the source;

receiving the structured data wherein the structured data has the first identifiers;

receiving a second mapping of the type names to second identifiers, wherein the second identifiers uniquely identify the structured data types, wherein at least one second identifier that uniquely identifies the at least one type name is smaller in length than the at least one type name, wherein the second mapping is provided in a target, wherein the second identifiers uniquely identify the structured data types within the target, and wherein no data representation that maps source data structures to target data structures is maintained;

modifying the structured data by:
(i) mapping the first identifiers in the structured data to corresponding type names from the first mapping;
(ii) mapping the corresponding type names to the second identifiers from the second mapping; and
(iii) substituting the first identifiers in the structured data with the second identifiers; and sending the modified structured data to the target after modifying the structured data.

2. The computer implemented method of claim 1, wherein the first mapping is part of a metadata data structure.

3. The computer implemented method of claim 1, wherein the source and the target are databases.

4. The computer implemented method of claim 3, wherein the databases are relational database management systems.

5. The computer implemented method of claim 1, wherein an application within the target performs receiving the first mapping, receiving the structured data, receiving the second mapping, and modifying the structured data.

6. The computer implemented method of claim 1, wherein each structured data is an object and each structured data type is a corresponding class.

7. The computer implemented method of claim 1, wherein the received structured data is generated by an application.

8. The computer implemented method of claim 1, wherein the received structured data is generated by a database.

9. The computer implemented method of claim 1, wherein the structured data that is transformed does not include type names.

10. A computer system for transforming structured data, wherein each structured data is an instance of one of at least one structured data type, wherein each structured data type has a type name, the computer system comprising:

a processor;

means for receiving a first mapping of at least one type name to at least one first identifier, wherein each first identifier uniquely identifies one structured data type, wherein the at least one first identifier is smaller in length than the at least one type name, wherein the first mapping is provided in a source, and wherein the first identifiers uniquely identify the structured data types within the source;

means for receiving the structured data wherein the structured data has the first identifiers;

means for receiving a second mapping of the type names to second identifiers, wherein the second identifiers uniquely identify the structured data types, wherein at least one second identifier that uniquely identifies the at least one type name is smaller in length than the at least one type name, wherein the second mapping is provided in a target, wherein the second identifiers uniquely identify the structured data types within the target, and wherein no data representation that mans source data structures to target data structures is maintained;

means for modifying the structured data by:
(i) mapping the first identifiers in the structured data to corresponding type names from the first mapping;
(ii) mapping the corresponding type names to the second identifiers from the second mapping; and
(iii) substituting the first identifiers in the structured data with the second identifiers; and means for sending the modified structured data to the target after modifying the structured data.

11. The computer system of claim 10, wherein the first mapping is part of a metadata data structure.

12. The computer system of claim 10, wherein the source and the target are databases.

13. The computer system of claim 12, wherein the databases are relational database management systems.

14. The computer system of claim 10, wherein an application within the target performs receiving the first mapping, receiving the structured data, receiving the second mapping, and modifying the structured data.

15. The computer system of claim 10, wherein each structured data is an object and each structured data type is a corresponding class.

16. The computer system of claim 10, wherein the received structured data is generated by an application.

17. The computer system of claim 10, wherein the received structured data is generated by a database.

18. The computer system of claim 10, wherein the structured data that is transformed does not include type names.

19. A computer readable storage medium including code for transforming structured data, wherein each structured data is an instance of one of at least one structured data type, wherein each structured data type has a type name, wherein the code when executed by a computer is capable of causing operations, the operations comprising:

receiving a first mapping of at least one type name to at least one first identifier, wherein each first identifier uniquely identifies one structured data type, wherein the at least one first identifier is smaller in length than the at least one type name, wherein the first mapping is provided in a source and wherein the first identifiers uniquely identify the structured data types within the source;

receiving the structured data wherein the structured data has the first identifiers;

receiving a second mapping of the type names to second identifiers, wherein the second identifiers uniquely identify the structured data types, wherein at least one second identifier that uniquely identifies the at least one type name is smaller in length than the at least one type name, wherein the second mapping is provided in a target, wherein the second identifiers uniquely identify the structured data types within the target, and wherein no data representation that maps source data structures to target data structures is maintained;

modifying the structured data by:
  (i) mapping the first identifiers in the structured data to corresponding type names from the first mapping;
  (ii) mapping the corresponding type names to the second identifiers from the second mapping; and
  (iii) substituting the first identifiers in the structured data with the second identifiers; and sending the modified structured data to the target after modifying the structured data.

20. The computer readable storage medium of claim 19, wherein the first mapping is part of a metadata data structure.

21. The computer readable storage medium of claim 19, wherein the source and the target are databases.

22. The computer readable storage medium of claim 21, wherein the databases are relational database management systems.

23. The computer readable storage medium of claim 19, wherein an application within the target performs receiving the first mapping, receiving the structured data, receiving the second mapping, and modifying the structured data.

24. The computer readable storage medium of claim 19, wherein each structured data is an object and each structured data type is a corresponding class.

25. The computer readable storage medium of claim 19, wherein the received structured data is generated by an application.

26. The computer readable storage medium of claim 19, wherein the received structured data is generated by a database.

27. The computer readable storage medium of claim 19, wherein the structured data that is transformed does not include type names.

* * * * *